United States Patent Office 3,093,739
Patented June 11, 1963

3,093,739
METHOD FOR DETERMINING FLUID FLOW IN A CONDUIT
John P. Danforth, Mount Clemens, and Robert E. Black, Utica, Mich., assignors to General Motors Corporation, Detroit, Mich., a corporation of Delaware
No Drawing. Filed Mar. 10, 1958, Ser. No. 720,079
3 Claims. (Cl. 250—106)

This invention relates to a method for detecting the flow path or other flow characteristics of a fluid through a conduit and has particular utility as a means for detecting the location of leaks in a conduit.

It has heretofore been proposed to trace the flow path through, or to detect the location of leaks in conduits by introducing a radioactive material into the fluid which is carried by the conduit such that the movement of the fluid can be detected by a Geiger counter. In practice, this method has various serious disadvantages. One of these disadvantages is that the radioactive material quickly becomes diluted in the fluid with the result that after a short period, the radioactive signal is of reduced intensity and is emitted from over a large area. Thus, the exact flow path is difficult to follow. An even more serious disadvantage of this previously proposed method is the potential health hazard of the radioactive material which is introduced into the conduit. This disadvantage is particularly acute where the method is intended to be used for the detection of leaks in mains for fluids such as water and fuel gas to which the public may be exposed.

It is an object of the present invention to provide a safe and accurate method for detecting the flow path and other flow characteristics of a fluid through a conduit. Another object of the invention is to provide an improved method for determining the location of leaks in a conduit. Still another object of the invention is the provision of a method for determining the exact rate and direction of fluid flow through a conduit. A more particular object of the invention is to provide a radioactive tracer method of determining the flow path and rate of a fluid through a conduit wherein the radioactive material is maintained separated from, and undiluted by the fluid.

These objects are accomplished in accordance with the invention by incorporating a radioactive material in a capsule which is suitably weighted to have the same average density as that of the fluid in the conduit, placing the capsule in the fluid, and then following the movement of the capsule by means of a radiation detector external of the conduit. Because the capsule has a density the same as that of the liquid it has no inherent tendency to either rise or sink in the fluid and thus little tendency to frictionally engage the walls of the conduit. The term "capsule" is intended to comprehend any supporting structure for the radioactive material which maintains the radioactive material separated from the fluid and which itself is sufficiently impervious to the fluid such that its density is not materially altered during the period of immersion in the fluid. For example, the capsule may take the form of a hermetically sealed envelope or it may take the form of a solid material having a satisfactory density. Where the method is used to detect the location of leaks, the conduit is blocked against fluid flow downstream of the estimated location of the leak and the capsule is inserted in the fluid upstream of this estimated location, the movement of the capsule then being followed by a radiation detector. The capsule moves with the fluid until it arrives at the location of the leak at which point its movement downstream ceases.

The following specific embodiment of the invention will serve to more fully illustrate:

A water conduit with a varying diameter of from 3 to 9 inches and passing underneath the concrete floor of an industrial plant at a depth of about two feet was known to have a leak at some location beneath the concrete floor. The conduit was blocked at a location downstream of the estimated location of the leak and the radioactive capsule was placed in the conduit upstream of this location. The movement of the capsule was followed by means of a Geiger counter, carried by a workman, until the source of the radioactivity signal became stationary indicating that the capsule had stopped. After a suitable mark was made on the concrete floor directly over the stationary radioactive signal, the block in the conduit was removed, the capsule thence continuing its movement downstream where it was captured for reuse. On digging down to the conduit at the marked spot, the location of the leak was found to be as indicated by the marking. The capsule employed in this particular instance comprised a small quartz vial of sodium-24 (30 millicuries) sealed in a polyethylene vial and positioned in the center of an ordinary sponge rubber ball about 2 inches in diameter, small lead weights being inserted in the ball such that its over-all density was the same as that of water.

In the instance where there are multiple leaks, the location of each of the leaks is indicated by changes in the rate of movement of the capsule. That is, the rate of flow, and therefore the movement of the capsule, is greatest up to the location of the first leak, at which location the rate of movement of the capsule diminishes. There is a similar reduction in the rate of movement at each subsequent leak until, at the last leak, the capsule stops. To increase the speed of the capsule to the leak location or locations, the fluid may be admitted under increased pressure upstream in the conduit.

In addition to expediting the location of leaks, the method of this invention has numerous other important utilities. For example, it may be used to chart the precise path of an inaccessible conduit. It sometimes occurs that the precise location of a branch line junction in a conduit is not known. In accordance with the present invention, the main conduit line may be blocked downstream of the estimated location of the junction and the radioactive capsule placed in the conduit upstream of this estimated location. The capsule is thereby forced to follow the flow through the branch line and the location of the junction is thereby pinpointed. The invention may also be used to determine the rate of flow through a conduit, the speed of the capsule, as it is followed by a radiation detector, being an accurate indication of the speed of the fluid.

Where the invention is used in a gas main the capsule may take the form of a rubber balloon filled with a radioactive gas or with ordinary gas together with a solid or liquid radioactive source, the weight of the filled balloon being adjusted such that its density is the same as that of the gas in the main. In the instance of an oil, water or other fluid main, the capsule may comprise a fluid-tight metal, glass, quartz, or plastic member containing the radioactive tracer.

While the invention has been described specifically with reference to a particular embodiment thereof, it is understood that changes and modifications may be made, all within the full and intended scope of the claims which follow.

We claim:

1. A method for detecting the location of an opening in a fluid conduit comprising the steps of blocking the conduit downstream of the estimated location of the opening, placing in the fluid upstream of the estimated location of the opening a capsule having substantially the same density as the fluid and containing a radioactive material, detecting any change in the rate of movement of the capsule through the conduit by following said capsule with a radiation detector external of said conduit, and then remove the capsule from the conduit.

2. A method for determining the location of a leak in a fluid conduit comprising the steps of blocking the conduit downstream of the estimated location of the leak, placing in the fluid upstream of the estimated location of the leak a capsule having substantially the same average density as the fluid and containing a vial of radioactive material, detecting with a radiation detector external of said conduit the position in said conduit at which the capsule ceases to move downstream, and then removing the block in the conduit thereby allowing the capsule to commence its movement downstream for removal from the conduit.

3. The method as set forth in claim 1 and wherein pressure is applied to the fluid upstream in the conduit to increase the rate of movement of the fluid and of the capsule through the conduit toward the opening.

References Cited in the file of this patent

UNITED STATES PATENTS

| | | |
|---|---|---|
| 2,456,233 | Wolf | Dec. 14, 1948 |
| 2,518,327 | Jahn | Aug. 8, 1950 |
| 2,588,210 | Crisman | Mar. 4, 1952 |
| 2,631,242 | Metcalf | Mar. 10, 1953 |
| 2,705,419 | Chawner | Apr. 5, 1955 |
| 2,822,776 | Morganstern | Feb. 11, 1958 |

OTHER REFERENCES

"Application of Radioisotopes to Leakage and Hydraulic Problems," by Pulman et al., Peaceful Uses of Atomic Energy, The United Nations Press, 1955, vol. 15, pages 147 to 151.